March 8, 1938.  G. G. HAVENS  2,110,225
RUBBER ARTICLE
Filed Jan. 28, 1937   2 Sheets-Sheet 1

INVENTOR.
GLENN G. HAVENS
BY
ATTORNEYS

Patented Mar. 8, 1938

2,110,225

UNITED STATES PATENT OFFICE 2,110,225

RUBBER ARTICLE

Glenn G. Havens, Detroit, Mich., assignor to United States Rubber Products, Inc., New York, N. Y., a corporation of Delaware Application January 28, 1937, Serial No. 122,686

11 Claims. (Cl. 152—13)

This invention relates to rubber products, and especially tires, which are less susceptible to cracking. It further aims to improve the resistance to flexure of vulcanized rubber products. It further aims to provide a tire, the bottoms of the grooves of the antiskid configuration of which are substantially more resistant to cracking and the side walls of which are more resistant to cracking.

These are some of the objects of the invention. Other objects will appear hereinafter.

This application is a continuation-in-part of my application Serial No. 95,807, filed August 13, 1936.

Rubber is more susceptible to deterioration while it is in a state of tension than when it is in a normal condition, that is, relaxed, or than when it is in a state of compression. It is believed that ozone in the air aggravates deterioration. The rate of deterioration, caused apparently by ozone, is apparently augmented when the rubber is under tension. Apparently the ozone progressively effects a separation of the particles of the rubber from the exposed rubber surface inwardly and thereby cracking results. Examples of such deterioration may be seen in the tread grooves and on the side walls of worn pneumatic tires.

In pneumatic tires, to which the invention is particularly applicable, tension is developed to a minor extent by the inflating pressure which stretches the rubber at the bottoms of the grooves defining the anti-skid configurations, and to a major extent at the rolling points of contact of the tires with the road in advance and in the rear of the constantly shifting area which is in direct engagement with the road. At these rolling points of contact the rubber is progressively bent or folded, the radius of curvature being less there than where the tire is flat against the road or throughout the rest of the circumference where the tire is approximately of its normal molded curvature or shape. It is believed that the repeated and incessant flexing of the rolling tire in changing from its normal shape to a flat shape, where it actually engages the road surface, produces tension in the rubber and makes the pneumatic tire susceptible to cracking.

By the present invention cracking may be substantially reduced or minimized. This may be done variously and by various means. In the case of pneumatic tires the tendency of cracking at the bases of the grooves defining the antiskid configurations may be reduced by deforming the tire so as to cause the grooves to flare and thereby to tension or stretch the rubber at the bases of the grooves and, while the bases of the grooves are in a state of tension, subjecting the tire to an elevated temperature for a short time. The side walls of the tires may also be rendered resistant to cracking by being placed in a state of tension and subjecting their surfaces to an elevated temperature for a short time. The heat treatment may be effected by a suitable heating medium such as hot air, steam, or superheated steam. The heat treatment should be such as to relieve the tension that has been created in the vulcanized rubber article by the deformation, or at least the greater portion of such tension and to a depth of the order of .04 of an inch, at least in the case of pneumatic tires.

In the case of pneumatic tires it is desirable, in order not to impair the wear-resisting characteristics or the appearance of the vulcanized rubber product, to localize or confine the heat treatment to the regions which are to be rendered resistant to cracking. In the case of tires, and particularly pneumatic tires, these regions are the bottoms of the grooves defining the antiskid configurations or the side walls. It is recommended generally that in practicing this invention superheated steam be employed and led by nozzles to the bottoms of the grooves which are to be rendered resistant to cracking and/or confined to the side walls. In this way the exact shape and configuration of the tread which has been molded to a desired antiskid configuration may be preserved accurately and sharply and there will be no appreciable or deleterious impairment of the wear-resisting characteristics of that portion of the rubber which constitutes the antiskid configurations proper.

Embodiments of the invention are illustrated in the accompanying drawings, in which.

Figure 1:
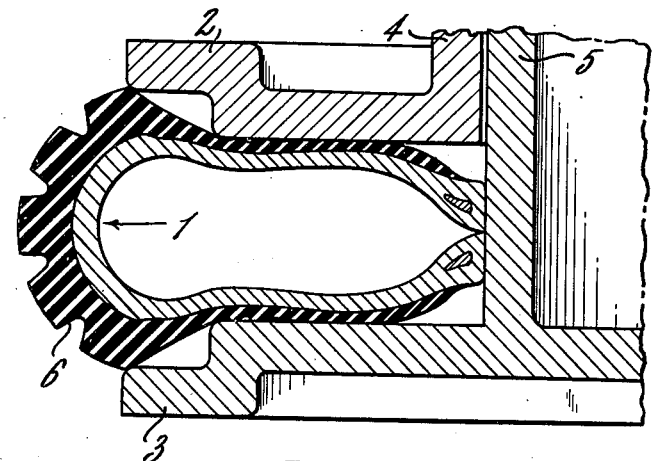
Fig. 1 is a cross section of a tire deformed to produce tension at the bottoms of the grooves in the tread.

In the drawings there is illustrated one of the many possible ways in which the article of this invention may be produced. In these the treatment of a tire is disclosed but it is to be understood that the invention in its broad aspect at least is applicable to the treatment of other vulcanized rubber products, such for instance as rubber footwear, belting, or in fact any rubber product where cracking may occur to an undesirable extent.

Figure 2:
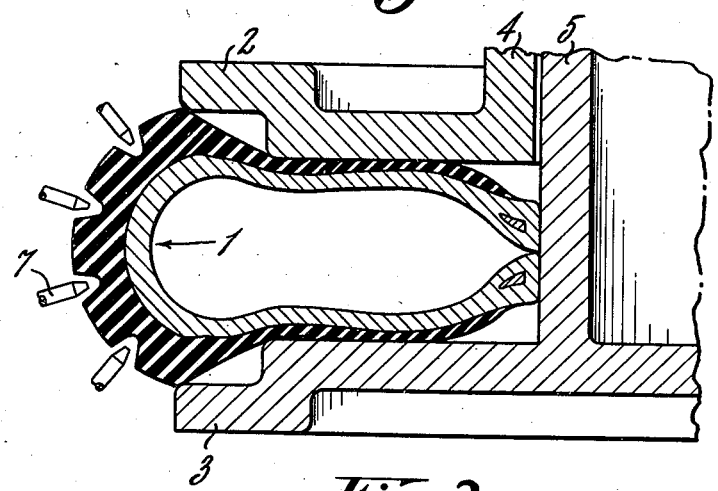
Fig. 2 is a similar view showing the tire being subjected locally to heat treatment by nozzles confining the heating medium to the bottoms of the grooves.

Referring to Figs. 1 and 2 of the drawings, the pneumatic tire casing indicated generally by the numeral 1 is shown with its side walls clasped between plates 2 and 3 having flanges at their inner circumferences as indicated at 4 and 5, respectively. This results in making grooves 6 in the tread flare outwardly and produce tension in the rubber at the bottoms of these grooves. While so held steam, and preferably superheated steam, at a temperature of around 550° F. for a period of around 20 seconds is directed through a multiplicity of nozzles 7, or other suitable means, to the bottoms of the grooves. Under this treatment the greater portion of the tension strains at the bases of the grooves are relieved and to a depth approximating .04 of an inch. The tire is then cooled down, and desirably this should be done rapidly as by a stream of cold water.

Figure 3:
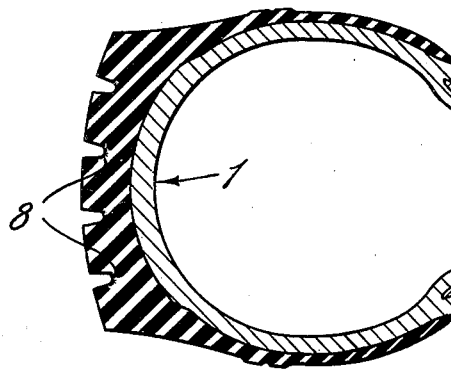
Fig. 3 is a cross section of the finished tire after it has been allowed to assume its normal vulcanized shape.

On removal of the tire from the clamping plates 2 and 3 it assumes the normal form in which it was initially vulcanized, as illustrated in Fig. 3, and in regaining its form it will be put in a state of compression at the zones indicated by the numeral 8 in Fig. 3. The creation of these zones of compression at the bottoms of the grooves renders them substantially more resistant to cracking, which fact has been established by tests. For instance, pads of rubber were made up in a form simulating the grooved tread of a pneumatic tire. Both of these were cured alike. One of these was treated in accordance with the principles of this invention and the other was not. Both were subjected to bending tests, but the untreated pad showed cracking after 240,000 bending cycles whereas the treated pad showed no signs of groove cracking after 1,000,000 bending cycles. These bending tests which were made in the factory under laboratory conditions were confirmed by service tests made on identical tires, some treated according to the present invention and others not. It was thus established that the invention substantially reduces the cracking tendency.

The temperature and duration of the heat treatment after vulcanization to which the tire casing, or other vulcanized rubber article, is subjected, will vary with the composition of the stock and the degree of compression it is desirable to develop in a zone or zones of the article to offset the particular liability of cracking or deterioration to which the tire or other article is susceptible without the treatment of this invention. Generally, the higher the temperature of the heating medium applied the shorter need be the duration of its application. Generally, of course, the shorter the duration of the heat treatment the greater the speed and economy of production.

It is deemed preferable to cool the tire properly after its brief heat treatment, as by spraying it with cold water, or introduction into a chamber maintained at below room temperature, or otherwise as may be convenient, but for some purposes rubber products after the treatment of this invention may be allowed to cool down as they will at room temperature.

It is to be distinctly understood that the illustration given of a brief heat treatment at 550° F. for 20 seconds is not critical or indispensable as to either the degree of heat or its duration. Any degree and any length of time may be employed for treating the vulcanized rubber product which will enable the desired portion or portions of the surface of the rubber article to be transformed from the condition in which they normally have on being finally vulcanized in their manufacture to a condition in which the portion or portions are superficially (to a depth of a few thousandths of an inch) placed in a state of compression and thereby rendered more resistant to cracking. It is believed that cracking, as before stated, is due primarily to the accelerated action of ozone on rubber in the state of tension, as distinguished from rubber in its normal state or in a state of compression. By this invention zones of the rubber product are superficially indurated and cracking to a substantial extent is minimized.

Figure 4:
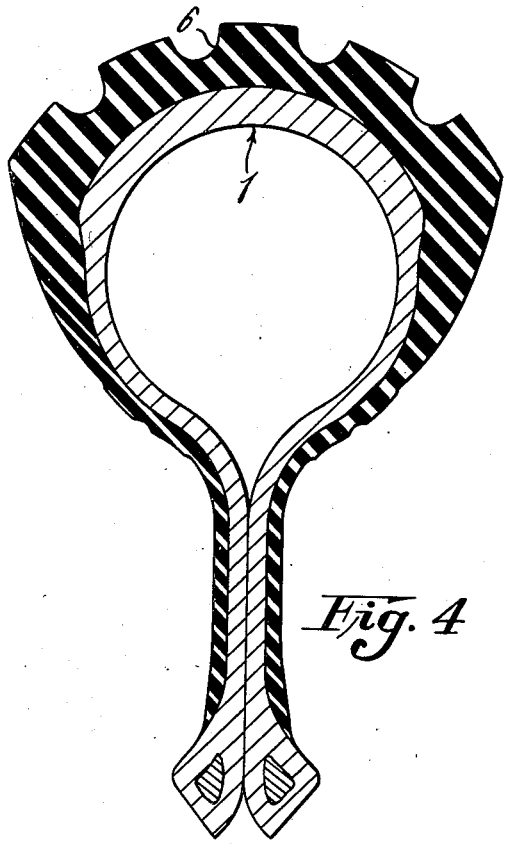
Fig. 4 is a section of a tire of my embodiment deformed so as to widen the grooves of the tread.
Figure 5:
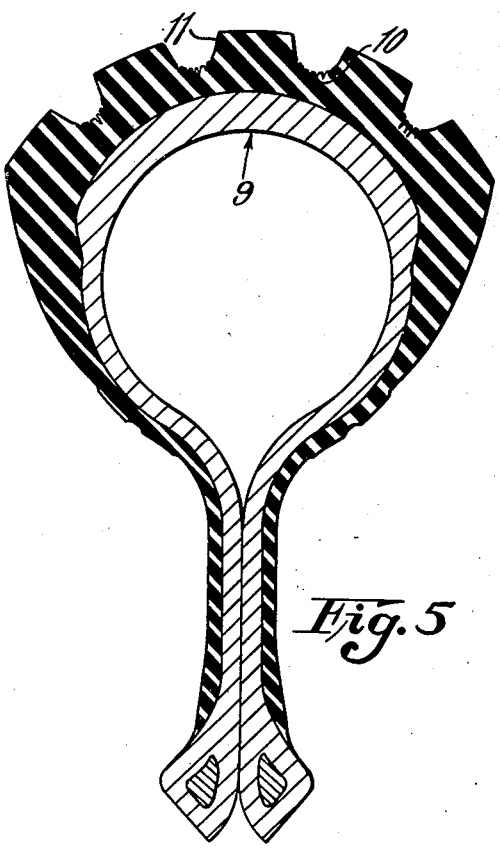
Fig. 5 is a comparative section of a conventional tire deformed so as to widen the grooves of the tread.

Figs. 4, 5, 6, and 7 illustrate methods of indicating the characteristics of the present invention and identifying it comparatively with conventional products. Fig. 4 illustrates the tire 1 after being subjected to the steam treatment. Fig. 5 illustrates a conventional tire or a tire not subjected to the steam treatment as practiced herein.

As ozone apparently deteriorates rubber, particularly under tension, a condition arises whereby a comparative test may be easily conducted to determine the presence of the inventive features of the invention. A tire section treated in accordance with my invention is deformed as shown in Fig. 4, and such deformation results in widening of the grooves 6 and a change in the strains in the rubber at the bottom of the grooves. Thereafter the tire section is subjected to the influence of ozone for a period of about 30 minutes, the content of ozone being in the order of 25 to 100 parts of ozone to 1,000,000 parts of air. As indicated in the drawings, and as supported by tests, there are few or no cracks apparent at the bottom of the grooves.

A conventional tire or a tire not subjected to the present steam treatment, but subjected to a similar ozone and deformation test, indicates a definite formation of cracks at the bottom of the grooves. This condition is illustrated in Fig. 5 which shows a tire 9 by way of comparison with the tire 1 of Fig. 4. A plurality of cracks appear at the bottom of the distended grooves 11 after the ozone treatment.

When a conventional tire is deformed, such as shown in Fig. 5, the zones of rubber 10 at the bottom of the grooves 11 are held under tension, and in such a state the rubber cracks or deteriorates rapidly when subjected to the influence of ozone. A tire of my embodiment has compression strains formed at the regions of the groove bottoms and therefore any subsequent widening of the grooves will result at first in decreasing the compression strains rather than imparting tension strains. Ozone apparently attacks or cracks rubber particularly when in the state of tension, and its detrimental action apparently increases in accordance with increased degrees of tension.

While the foregoing test is suggested as a method for determining the presence of the inventive features of the invention, it also illustrates the advantages of the invention. The similarity between this test and actual use of the tire arises in view of tension strains imparted to the regions at the bottom of the grooves while the tire is in operation, and in view of the presence of ozone in the atmosphere.

Figure 6:
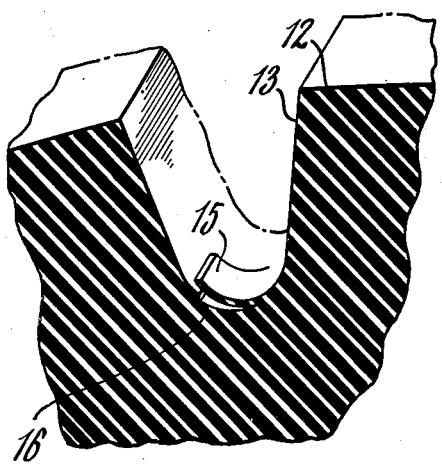
Fig. 6 is an enlarged perspective view of a portion of a tire tread illustrating a method of distinguishing the presence of the inventive features of my invention.

Another test for identifying the features of the present invention is illustrated by Fig. 6 which shows an enlarged view, in section, of a portion of the tread of a tire treated in accordance with the practice of the invention. In this view a tread 12 is shown having a groove 13 formed therein. At the base of the groove 13 a portion of the tread rubber adjacent the groove surface may be skived to form a thin sheet or layer 15. This layer, as shown in the drawings, need not be entirely removed from the body portion of the tread, but is cut so as to form a flap lying adjacent the remaining portion of the tread at the base of the groove 13. When the flap or layer 15 is lifted out of the cavity 16, from which the flap is cut, it will be noted that the flap increases in dimension, being greater than the dimensions of the cavity 16. The increase in dimension of the flap is principally in a direction transversely of the groove 13. The extent of the increase of the transverse length of the flap relative to transverse length of the cavity from which it is cut may be as great as 30%. This increase in transverse length of the flap is due to the release of the compression strains imparted to that region of the tread.

Figure 7:
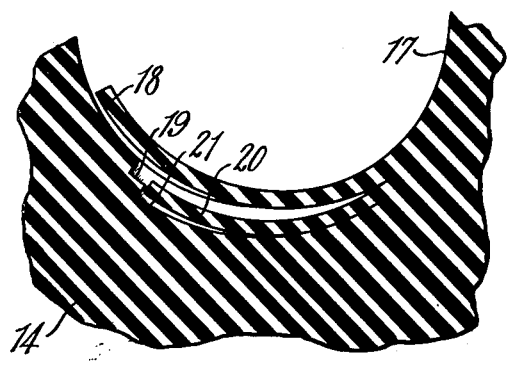
Fig. 7 is an enlarged view, in section, of a portion of a tire tread, illustrating a further method of distinguishing the presence of the inventive features of the embodiment.

By way of further illustrating this test, reference may be had to Fig. 7 which shows an enlarged view, in section, of a portion of a tread 14 of a tire treated in accordance with the practice of the invention. This section illustrates that portion of the tread which lies in the region of the base of a groove 17 forming part of the tread configuration. At the base of the groove 17 a portion of the tread rubber adjacent to the groove surface may be skived to form a thin sheet or layer 18 such as the layer 15 shown in Fig. 6. The layer 18 is partially severed from the tread so as to form a flap attached at one end to the tread proper. The cavity 19 represents the volumetric position of the flap before it is partially severed from the tread. After the flap 18 is partially severed from the tread and partially lifted out of the cavity 19, its length transversely of the tread increases due to the release of compression strains imparted to the tread as a result of the practice of the invention.

If a somewhat similar flap 20 is cut from the tread below the cavity 19, forming a cavity 21, it will be noted that the flap 20 presents no tendency to elongate as in the case of the flap 18.

From this test it becomes evident that that portion of rubber lying adjacent the surface of the bottom of the groove contains compression strains to a substantial degree, whereas that portion of rubber in the region of the groove base which lies further away from the surface of the bottom of the groove is relatively free from compression strains.

In the case illustrated the compression strains at the groove base do not extend in depth to a dimension greater than the thickness of the relatively thin flap or layer of rubber 15. However, it is to be understood that compression strains may extend to varying depths, depending on the results desired. In the present embodiment it is desirable that the compression strains extend to a depth sufficient only to insure that the rubber at the surface of the bottom of the grooves in the tread will not crack when exposed to ozone and that cuts, due to stones or sharp objects, will not grow appreciably in length.

The invention is intended for particular application to newly vulcanized rubber articles but, of course, may be applied with some advantage to old products.

While the invention has been described with particular reference to a field of large applications, to wit, the manufacture of tires, and especially pneumatic tires, it is obviously susceptible of application to other rubber products.

The underlying principle of the invention is to provide a zone or area of the rubber article less susceptible to cracking by having the rubber at and immediately adjacent the surfaces of a zone or any other area of the article exposed to air or similar deteriorating influence, in a state of compression in which normally at least the state of compression is maintained by the rest of the material, whether it be rubber alone, or rubber and fabric; or other materials of which the article is made. In pneumatic tires the invention has specific applicability to the base of the grooves defining the antiskid configuration, whether that configuration be continuous ribs or a series of tread projections, blocks or the like, or a combination of ribs and blocks. The invention may be produced not merely as detailed with respect to treating the base of the groove defining the antiskid configuration of the tire by means of nozzles directing the heating medium to the bottoms of the grooves, but it broadly comprehends the brief heat treatment at elevated temperatures of an already vulcanized article in zones or areas where cracking is likely or objectionable. Any suitable and convenient method and apparatus may be employed to heat-treat the article to obtain a product of this invention. Reference should therefore be made to the accompanying claims for an understanding of the scope of the invention.

Having thus described my invention, what I claim and desire to protect by Letters Patent is:

1. An article of manufacture embodying vulcanized rubber having increased resistance to cracking at and near surface portions thereof characterized in that the zone or area of the rubber normally tending to crack in service is composed of vulcanized rubber composition having when the article is undeformed a compression strain therein induced by pressure in said zone or area from an adjacent mass of rubber.

2. An article of manufacture embodying vulcanized rubber having increased resistance to cracking at and near surface portions thereof characterized in that the zone or area of the rubber normally tending to crack in service is composed of vulcanized rubber composition having when the article is undeformed a compression strain therein induced by pressure in said zone or area from an adjacent mass of rubber, and further characterized in that said zone or area is a layer having a thickness not substantially greater than about .04 inch.

3. An article of manufacture having a strain-resisting portion and a portion of vulcanized rubber composition united to the strain-resisting portion, said vulcanized rubber composition having when in a natural unloaded condition one or more zones at an external surface thereof held under compression by the vulcanized rubber composition underlying said zone or zones.

4. A pneumatic tire having a carcass and a wear-resistant tread of vulcanized rubber composition, said wear-resistant tread having an antiskid configuration defined in part at least by grooves, the portions of the rubber composition at and the immediately adjacent surfaces of the bottoms of said grooves being in a state of compression greater than the underlying vulcanized rubber composition.

5. A vulcanized rubber tire having definite thin portions of its surfaces held in compression solely by the underlying material of the tire in its normal condition free from service load and thereby rendered resistant to cracking at such portions of its surfaces.

6. A pneumatic tire having side walls and a tread in part at least of vulcanized rubber composition, portions of which composition at and immediately adjacent the external surface of such composition being in a state of compression when the tire is in natural unloaded condition, said state being induced at least in part by underlying vulcanized rubber composition.

7. A pneumatic tire having a vulcanized rubber composition tread provided with one or more circumferentially extending grooves, the bottom surfaces of said grooves and the immediately adjacent underlying composition being in a state of compression whereby cracking tendencies are resisted.

8. A vulcanized body of rubber composition having a thin surface layer having lower extension strains than the adjacent rubber of the body.

9. A vulcanized body of rubber composition having a surface zone approximately .04 inch thick characterized by being in a natural compressed condition relative to the adjacent rubber of the body.

10. A vulcanized body of rubber composition having a surface zone approximately .04 inch thick characterized by naturally having different strains than the adjacent rubber of the body.

11. A pneumatic tire having a carcass and a wear-resistant tread of vulcanized rubber composition, said wear-resistant tread having an antiskid configuration defined in part at least by grooves, the portions of the rubber composition at and the immediately adjacent surfaces of the bottoms of said grooves being in a state of compression greater than the underlying vulcanized rubber composition when the tire is in natural unloaded condition, said state of compression being induced by pressure in said portions from a contiguous mass of vulcanized rubber composition.

GLENN G. HAVENS.